(12) United States Patent
Tran et al.

(10) Patent No.: US 11,079,127 B2
(45) Date of Patent: Aug. 3, 2021

(54) SYSTEMS AND METHODS FOR AIR VENTILATION

(71) Applicants: Bao Tran, Saratoga, CA (US); Dave Nyhof, Shipshewana, IN (US)

(72) Inventors: Bao Tran, Saratoga, CA (US); Dave Nyhof, Shipshewana, IN (US)

(73) Assignee: Blockchain Generation Ventures, Reno, NV (US)

( * ) Notice: Subject to any disclaimer, the term of this patent is extended or adjusted under 35 U.S.C. 154(b) by 231 days.

(21) Appl. No.: 16/427,699

(22) Filed: May 31, 2019

(65) Prior Publication Data

US 2020/0063999 A1 Feb. 27, 2020

Related U.S. Application Data

(60) Provisional application No. 62/804,755, filed on Feb. 13, 2019, provisional application No. 62/802,910, (Continued)

(51) Int. Cl.
*F24F 11/00* (2018.01)
*F24F 3/16* (2021.01)
(Continued)

(52) U.S. Cl.
CPC .......... *F24F 11/0001* (2013.01); *E03B 7/071* (2013.01); *F24F 8/10* (2021.01); *G01M 3/184* (2013.01); *G05B 13/0265* (2013.01); *G06F 21/602* (2013.01); *G06Q 20/06* (2013.01); *H04L 9/3252* (2013.01); *H04L 63/0428* (2013.01); *F24F 2011/0002* (2013.01); *F24F 2110/12* (2018.01); *F24F 2110/22* (2018.01); *F24F 2110/52* (2018.01); *F24F 2110/66* (2018.01); *F24F 2110/70* (2018.01); *F24F 2140/40* (2018.01); *G06Q 2220/00* (2013.01); *H04L 2209/38* (2013.01); *H04L 2209/56* (2013.01)

(58) Field of Classification Search
CPC combination set(s) only.
See application file for complete search history.

(56) References Cited

U.S. PATENT DOCUMENTS 7,331,852 B2 * 2/2008 Ezell .................. F24F 11/30
454/229
7,632,178 B2 * 12/2009 Meneely, Jr. ........ F24F 11/0001
454/239

(Continued)

FOREIGN PATENT DOCUMENTS

CN 105987488 A * 10/2016

OTHER PUBLICATIONS

Fan, CN105987488A English machine translation, Oct. 5, 2016 (Year: 2016).*

*Primary Examiner* — Kenneth J Hansen
*Assistant Examiner* — Phillip Decker
(74) *Attorney, Agent, or Firm* — Power Patent, PC

(57) ABSTRACT

A system includes an inlet to collect air from outside a building; an air filter coupled to the inlet; a baffle to receive air from the inlet; an actuator coupled to the baffle; one or more sensors exposed to air from the air filter to determine air quality; a controller coupled to the one or more sensors and the actuator, the controller closing the baffle if air quality is below a threshold; and an outlet positioned after the baffle to deliver air to the building.

20 Claims, 11 Drawing Sheets

Related U.S. Application Data filed on Feb. 8, 2019, provisional application No. 62/800,334, filed on Feb. 1, 2019, provisional application No. 62/800,344, filed on Feb. 1, 2019, provisional application No. 62/800,349, filed on Feb. 1, 2019, provisional application No. 62/768,078, filed on Nov. 15, 2018, provisional application No. 62/744,660, filed on Oct. 12, 2018, provisional application No. 62/720,981, filed on Aug. 22, 2018, provisional application No. 62/720,986, filed on Aug. 22, 2018, provisional application No. 62/720,989, filed on Aug. 22, 2018.

(51) Int. Cl.
| | | |
|---|---|---|
| *G05B 13/02* | (2006.01) | |
| *G06F 21/60* | (2013.01) | |
| *G06Q 20/06* | (2012.01) | |
| *H04L 9/32* | (2006.01) | |
| *H04L 29/06* | (2006.01) | |
| *E03B 7/07* | (2006.01) | |
| *G01M 3/18* | (2006.01) | |
| *F24F 8/10* | (2021.01) | |
| *F24F 110/12* | (2018.01) | |
| *F24F 140/40* | (2018.01) | |
| *F24F 110/52* | (2018.01) | |
| *F24F 110/66* | (2018.01) | |
| *F24F 110/70* | (2018.01) | |
| *F24F 110/22* | (2018.01) | |

(56) References Cited

U.S. PATENT DOCUMENTS

| | | | |
|---|---|---|---|
| 8,092,285 B2 * | 1/2012 | Mathur | B60H 3/0085 |
| | | | 454/75 |
| 9,322,568 B2 | 4/2016 | Aycock | |
| 10,161,115 B2 | 12/2018 | Beger | |
| 2005/0186901 A1 * | 8/2005 | Moore, Jr. | F24F 8/10 |
| | | | 454/292 |
| 2008/0182506 A1 * | 7/2008 | Jackson | F24F 11/30 |
| | | | 454/354 |
| 2010/0035536 A1 * | 2/2010 | Brooks | F24F 11/30 |
| | | | 454/256 |
| 2011/0174054 A1 * | 7/2011 | Lynn | G01N 27/4045 |
| | | | 73/31.02 |
| 2015/0140919 A1 * | 5/2015 | Zwijack | F24F 11/30 |
| | | | 454/256 |
| 2017/0059199 A1 * | 3/2017 | Zhang | B60H 1/00807 |
| 2017/0346848 A1 * | 11/2017 | Smith | H04L 63/06 |
| 2017/0350611 A1 * | 12/2017 | Su | F24F 3/16 |
| 2017/0356670 A1 * | 12/2017 | Zhang | F24F 12/006 |
| 2018/0048485 A1 * | 2/2018 | Pelton | G05B 19/0428 |
| 2018/0127957 A1 | 5/2018 | Enev | |

\* cited by examiner

SYSTEMS AND METHODS FOR AIR VENTILATION

BACKGROUND

The present invention relates to an air exchange system with air quality control.

Three basic types of fresh air ventilation systems exist: supply-type, consisting of a fresh air intake system only, which tends to pressurize the house, exhaust-type, having only a stale air exhaust system, which tends to depressurize the house, and the balanced-type, having both fresh air intake and stale air exhaust, which tends to maintain a neutral pressure in the house. A balanced type system can also provide the option of employing heat/moisture transfer between the intake and exhaust air streams, by combination with a Heat Recovery Ventilator/Energy Recovery Ventilator (HRV/ERV) or other heat-exchanging device.

SUMMARY

In one aspect, a system includes an inlet to collect air from outside a building; an air filter coupled to the inlet; a baffle to receive air from the inlet; an actuator coupled to the baffle; one or more sensors exposed to air from the air filter to determine air quality; a controller coupled to the one or more sensors and the actuator, the controller closing the baffle if air quality is below a threshold; and an outlet positioned after the baffle to deliver air to the building.

Implementations of the system can include one or more of the following. The air inside the building is combined with air from the outlet. The air filter is removable or replaceable. An air heater or air conditioner is connected to the outlet. The actuator opens the baffle if outside air quality is better than indoor air quality. The actuator prevents cold or hot air from entering the building. Other benefits include one or more of the following.
1. Know the air quality.
2. Know the humidity.
3. Know the saving energy.
4. Taking back the control of the air users breathe.
5. Block out pollution.
6. Block out humidity.
7. Save Money.

DESCRIPTION

Figure 1A:
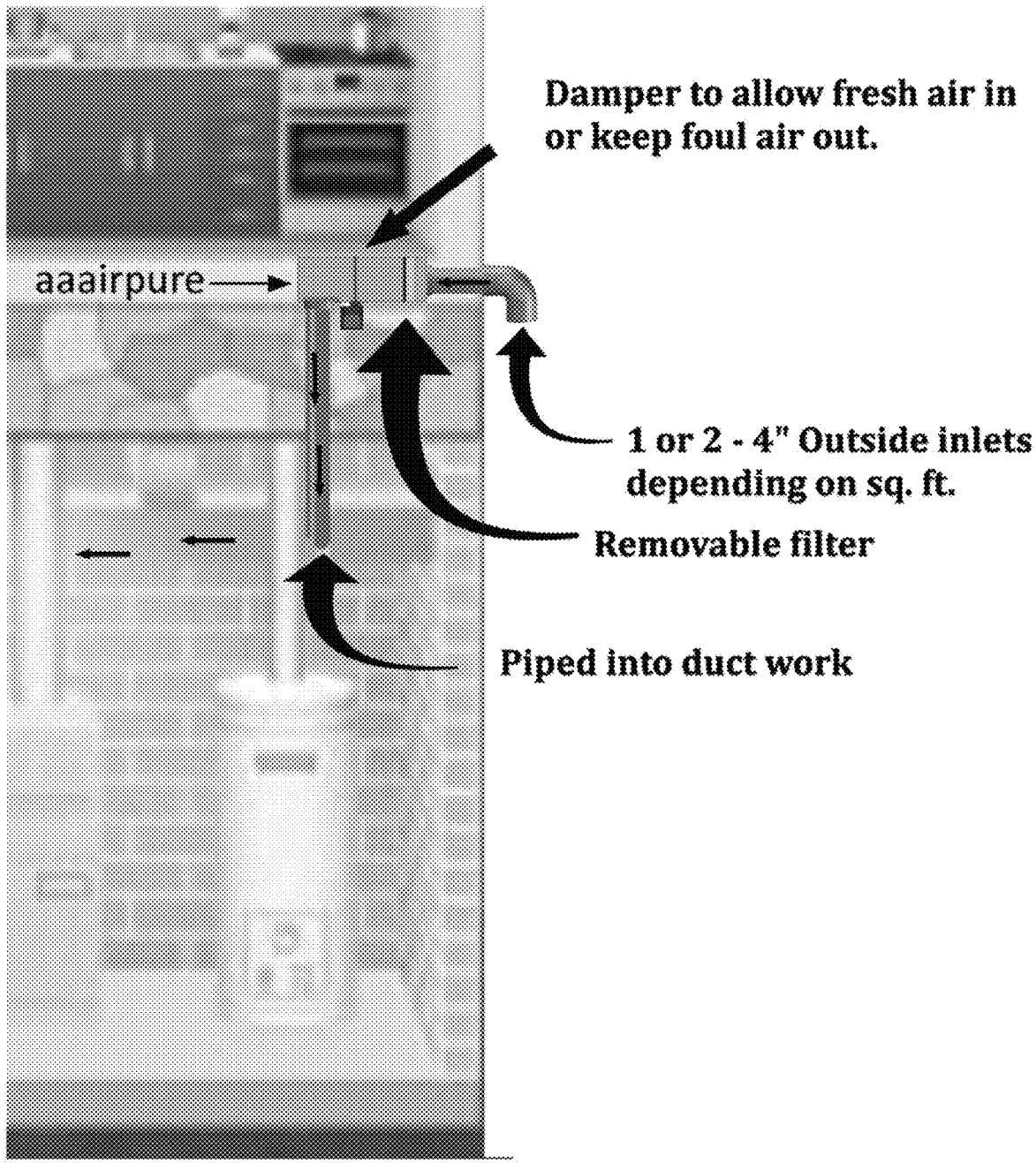
FIGS. 1A-1C show exemplary air flow systems controlled by air quality sensors and a baffle to gate air.
Figure 2A:
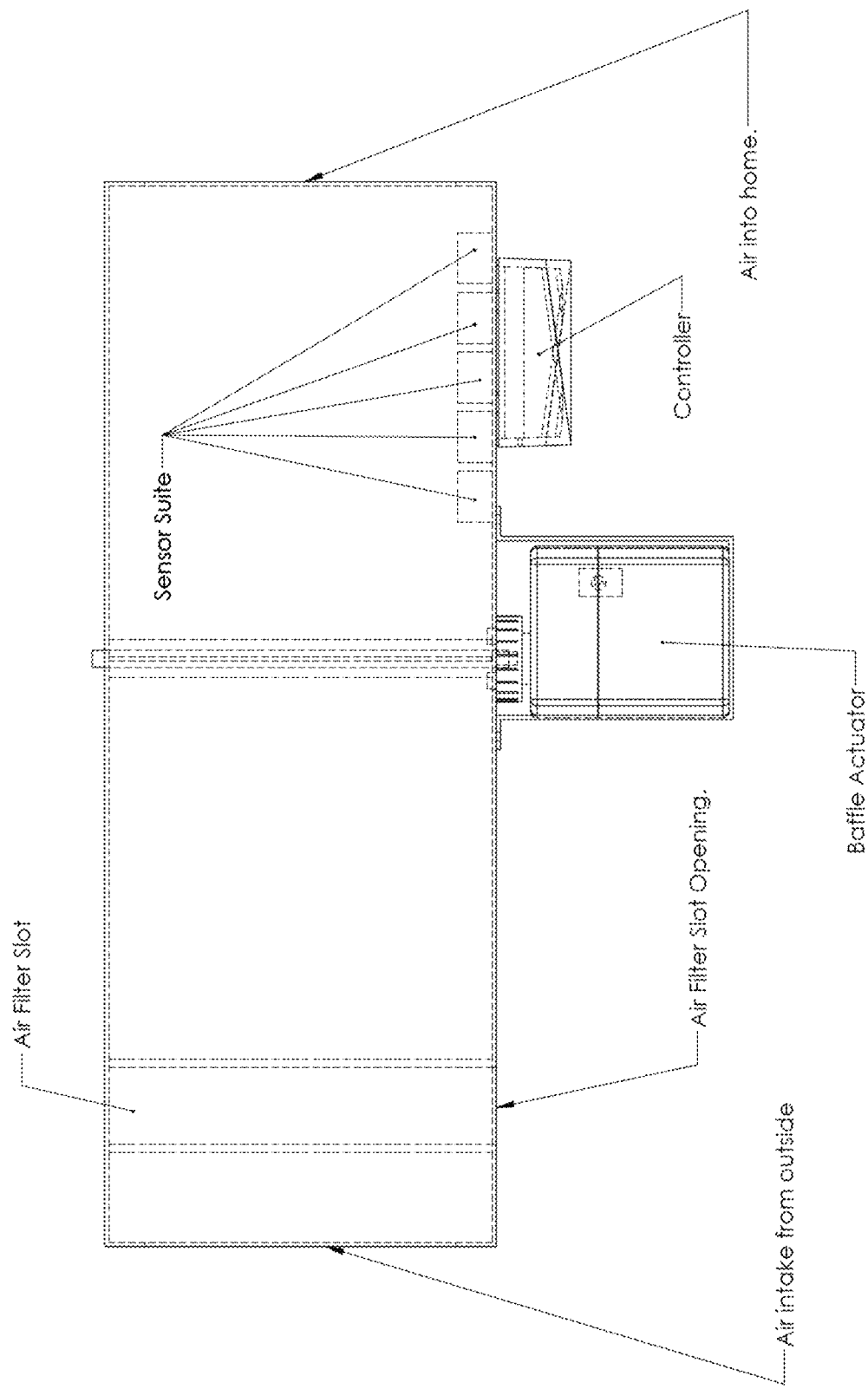
FIGS. 2A-2B show exemplary views of an air flow system.
Figure 2B:
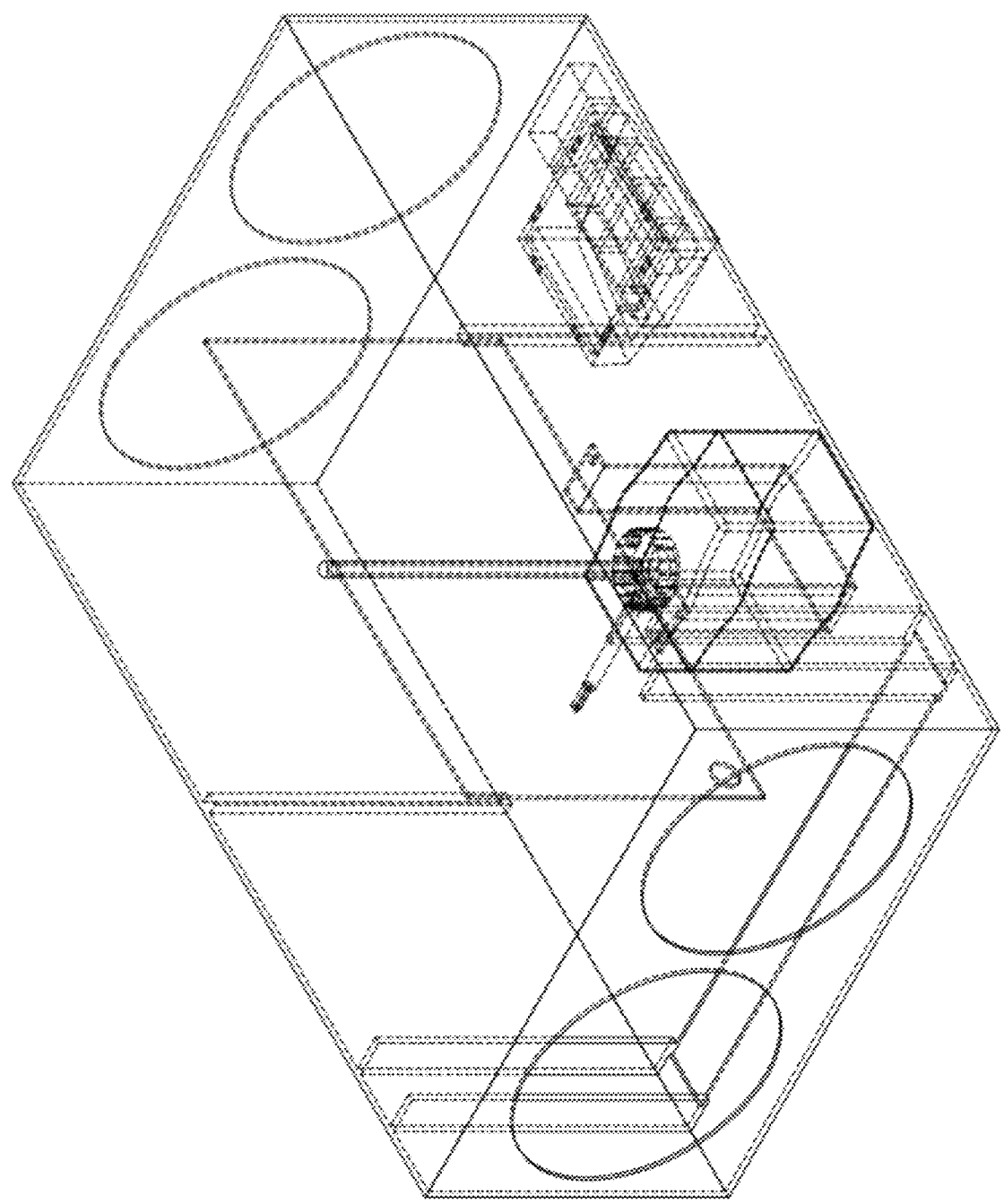

FIG. 1A shows an exemplary ventilation system that maintains air quality for the whole house. In this system, sensors are provided in the home/office space as well as in the ventilation unit. The ventilation unit, shown in detail in FIG. 2, includes an air intake to receive air from outside the building or home. Outside air travels through an air filter slot or recess with an opening to receive an air filter that can periodically be replaced or cleaned. After filtering, air quality is sensed by a sensor suite and processed by a controller. If the air quality is below a predetermined threshold, a baffle actuator is activated to turn a damper to shut off air flow from the outside. The damper allows fresh air in or keep foul air out to control air quality for the occupants of the building. If the air quality passes the threshold requirement, it is delivered to the home/building so occupants have fresh clean air.

Figure 1B:
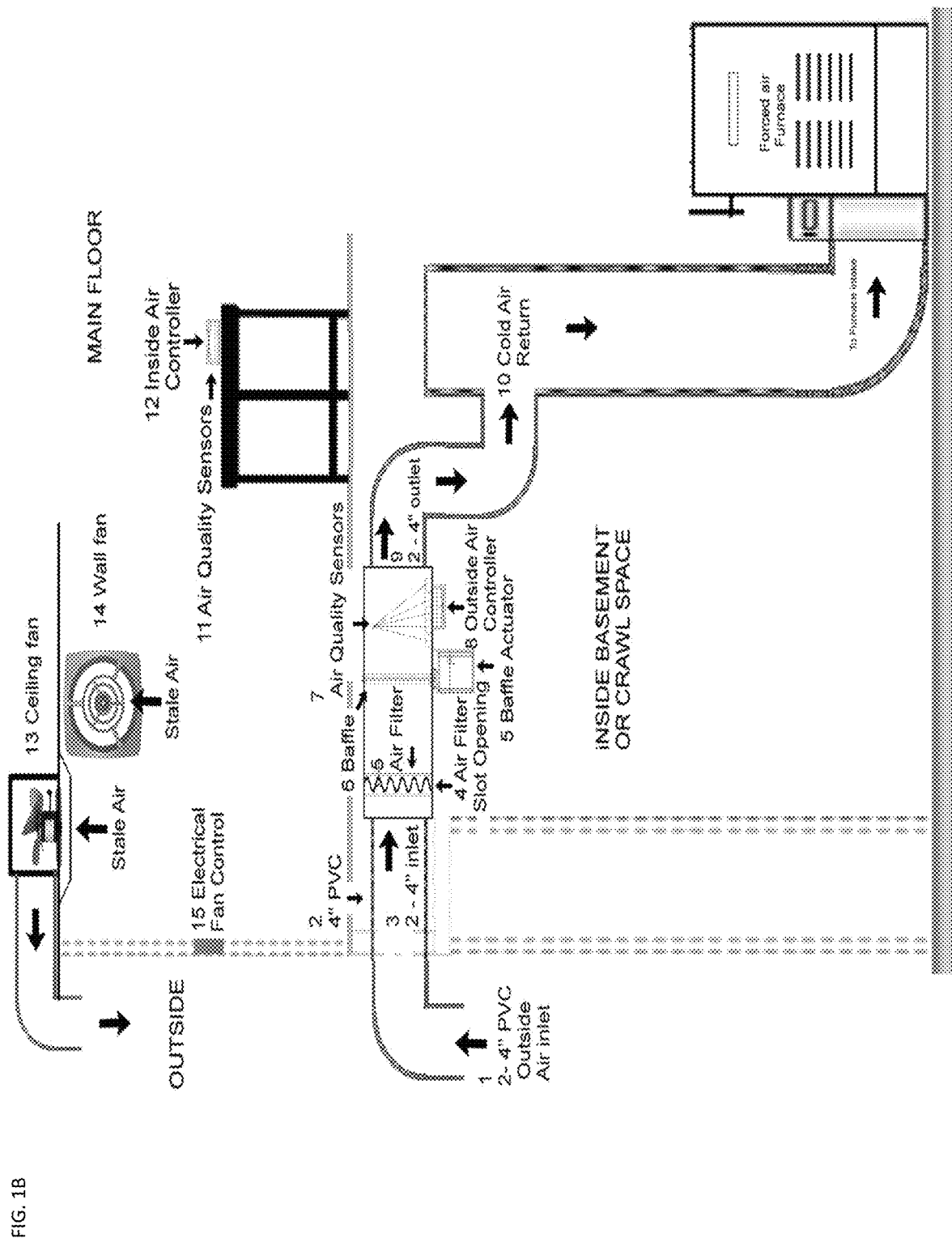

As shown in the embodiment of FIG. 1B, air from the outside is drawn into the ventilation system and checked for quality. The inlets can be about one to four inches piping, depending on the volume of the building. Air quality is checked, and if it passes the threshold, is piped into the duct work for heating or cooling as needed before delivery to the occupants.

The system, called AYR, utilizes a full air-quality sensor suite and low energy controller combined with a cryptographic data records system which can track air quality that is inside and outside our homes and business. AYR systems can reduce wasted air cycles by monitoring the air both in and out of the home or business and comparing them to know when to draw in fresh air and when not to; thus saving energy and improving air quality.

Air is drawn into the structure using exhaust fans such as bathroom exhaust fans. An AYR AES is positioned near an outer wall of a dwelling and uses two 4" PVC pipes connected directly to the outside and two connected to the inside to monitor incoming air from outside. The outside air will first pass through a filter to catch any particulates (there will be a reminder each month to change out your filter). The AYR AES is equipped with a full range of sensors to monitor Oxygen, Carbon Dioxide, Carbon Monoxide, Humidity, Formaldehyde, Temperature, TVOC and dust particulates from the outside of the dwelling. There will be at least one AYR AES placed on the main floor of the building. Another sensor set with the same sensors to monitor the air quality is placed in different vicinity or another level. These sensors each have a controller that communicates with each other to compare conditions and take a scientifically appropriate action whether to draw in fresh air, or not. The system works as a pair to always maintain the best available air quality of the home.

Where climates are extremely cold a ceramic electric element can be put inline. It will go on when temperatures go below 50° F. and will only go on when the baffle is open. The system will use only enough electricity to keep room temperature at 72° F.

Figure 1C:
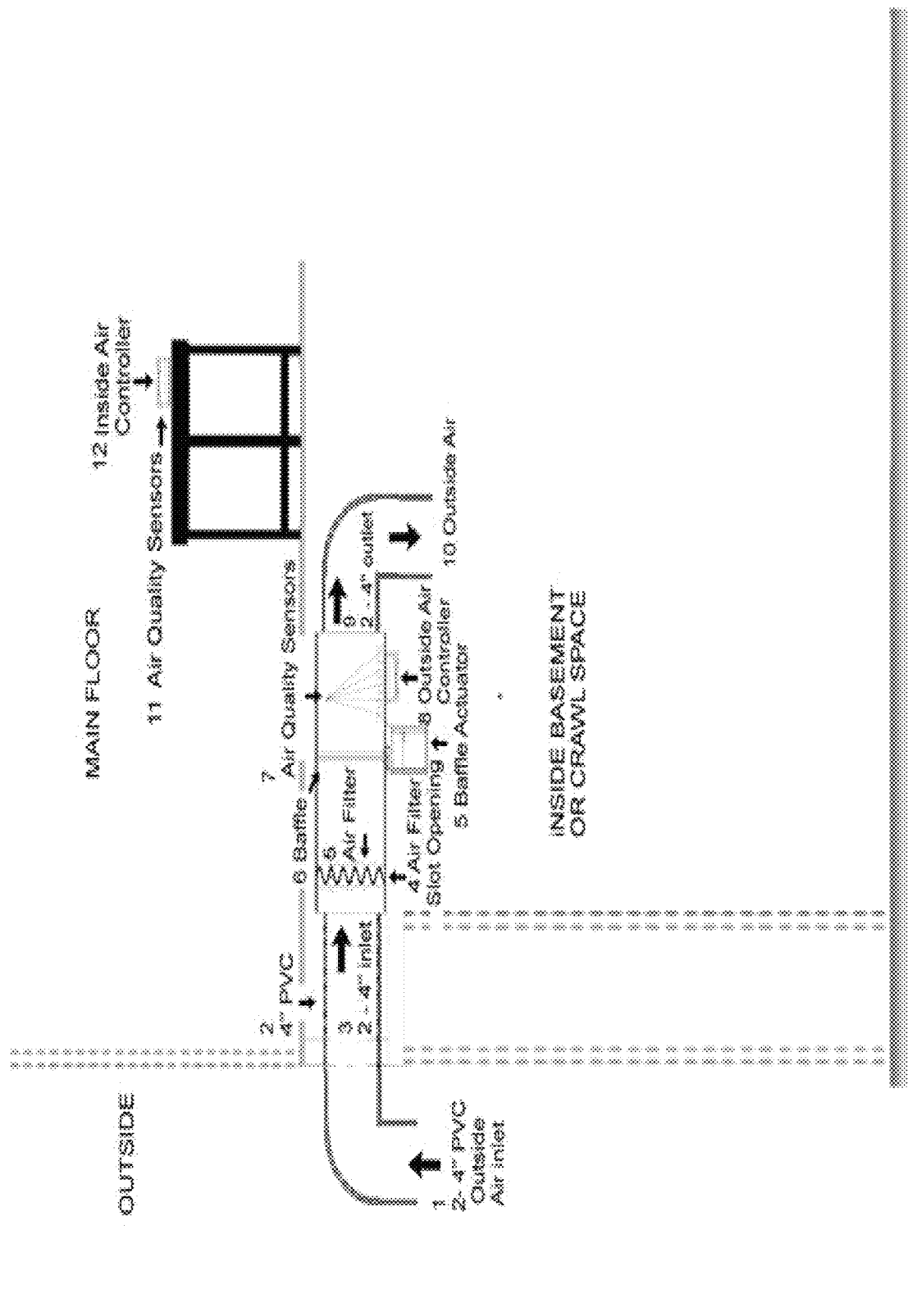
Figure 3A:
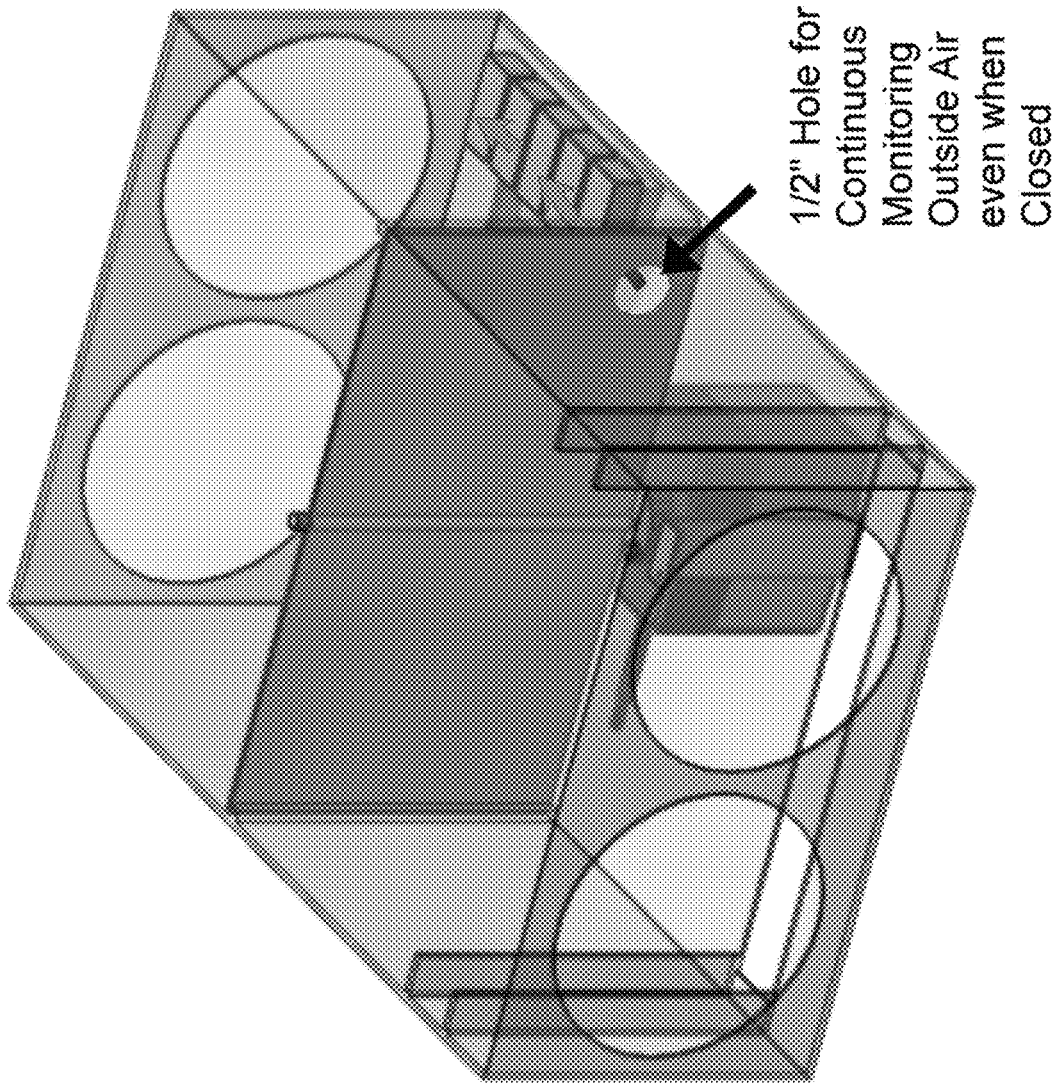
FIGS. 3A-3B show exemplary views of the air flow system in closed and open conditions.
Figure 3B:
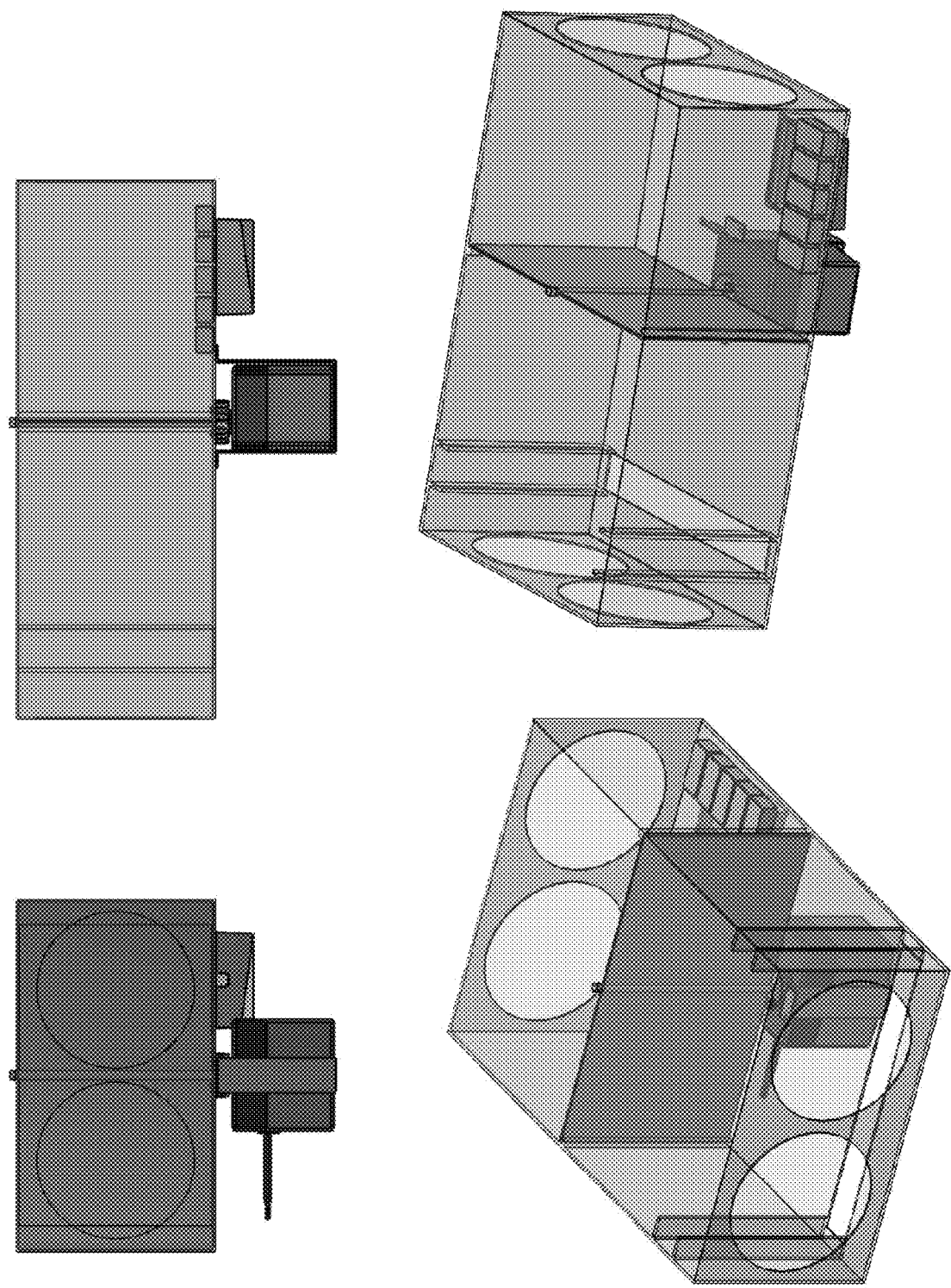

In the embodiment of FIG. 1B, outside air flows through inlet pipes 1-2 and goes through air filter 6 which is inserted through opening 4. A baffle actuator 5 controls baffle 6 inside the air tube. The actuator 5 controls air flow, whose quality is analyzed by air quality sensors 7. Outside air controller 8 receives sensors 7 output and controls the actuator 5 accordingly. The air exits pipe 9 to a cold air return 10 that is connected to a forced air furnace, for example. Moreover, a plurality of air quality sensors 11 inside air controllers 12 are placed at various points in the house. The sensor output is provided to the inside air controller 12, which turns ceiling fan 14 and wall fan 14 to move stale air to the outside environment. The outside air controller and assembly can be inside the basement or crawl space, while the inside air controller can be dispersed inside the occupancy areas of the house or building in this example. Components of the system of FIG. 1C can include the following:

The elements of FIG. 1B are as follows:
1. 2-4" PVC Elbows
2. 2-4" PVC Pipes
3. 2-4" Inlets
4. Air Filter Opening
5. Baffle Actuator
6. Baffle
7. Air Quality Sensors
8. Outside Air Controller
9. 2-4" outlets
10. Cold Air Return
11. Air Quality Sensors
12. Inside Air Controller
13. Ceiling Fan
14. Wall Fan
15. Electrical Fan Control FIG. 1C shows another embodiment for air flow control. In this embodiment, outside air flows through inlet pipes 1-2 and goes through air filter 6 which is inserted through opening 4. A baffle actuator 5 controls baffle 6 inside the air tube. The actuator 5 controls air flow, whose quality is analyzed by air quality sensors 7. Outside air controller 8 receives sensors 7 output and controls the actuator 5 accordingly. The air exits pipe 9 to outside air. The controller and assembly can be inside the basement or crawl space. Components of the system of FIG. 1C can include the following:
1. 2-4" PVC Elbows
2. 2-4" PVC Pipes
3. 2-4" Inlets
4. Air Filter Opening
5. Baffle Actuator
6. Baffle
7. Air Quality Sensors
8. Outside Air Controller
9. 2-4" outlets
10. Outside Air
11. Air Quality Sensors
12. Inside Air Controller FIGS. 2A-2B and FIGS. 3A-3B show various exemplary views of a housing for the ventilation unit. The controller is typically below the ventilation unit adjacent to a suite of air sensors. In this embodiment, the baffle divides the ventilation unit into two spaces and can seal off air from the outside or alternatively can be opened. In the view of FIG. 3B, the baffle is opened to allow free air flow, and can be closed open to seal off air flow. As shown in FIG. 3A, a ½" hole is provided for continuous monitoring of outside air even when the vent is closed.

Figure 4:
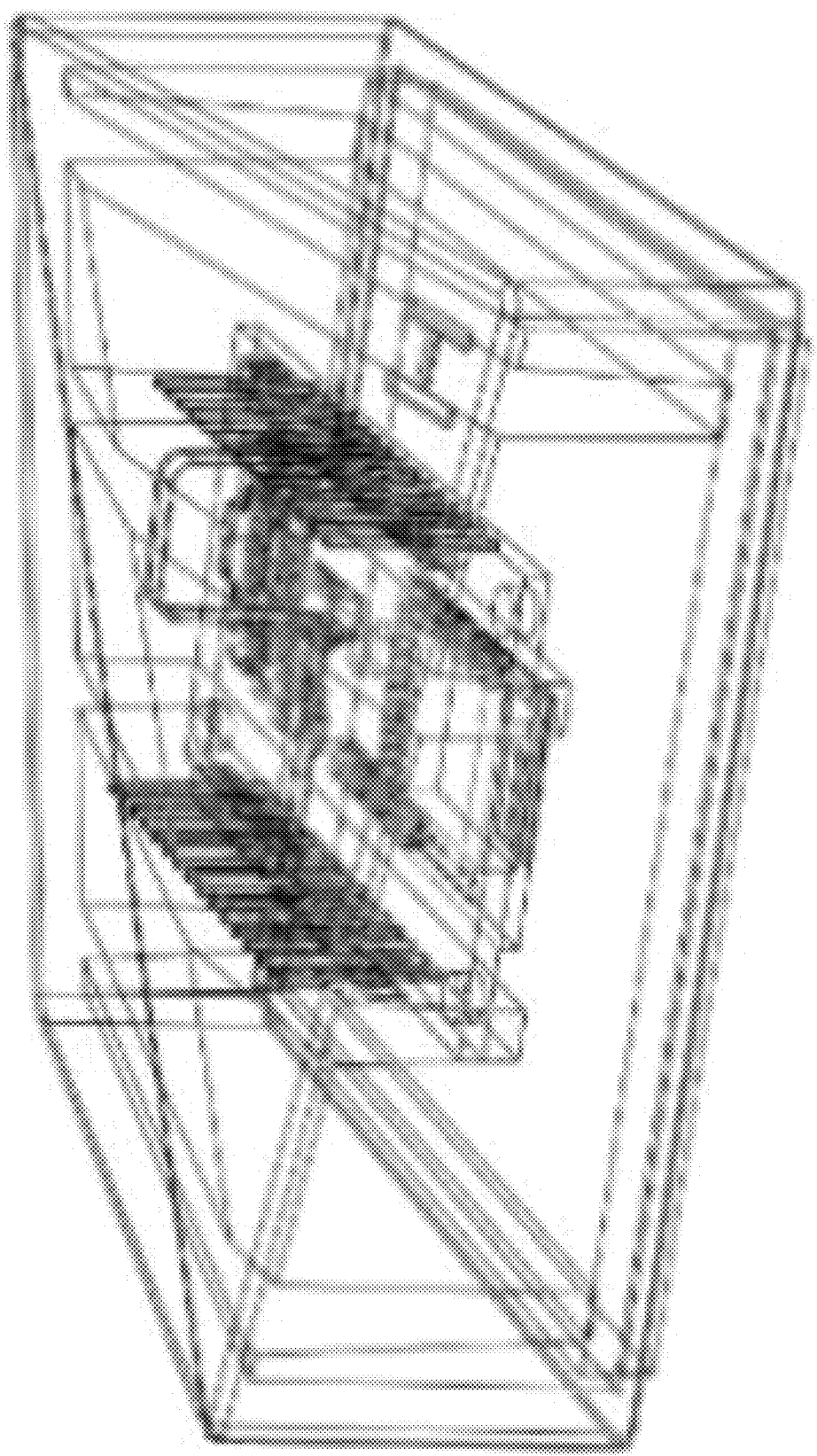
FIG. 4 shows exemplary view of an air flow controller.

FIG. 4 shows an exemplary controller unit. In one embodiment, the unit is installed even with the damper in the closed position will allow enough air to flow over the sensors to get a continuous outside air reading. This reading will be compared with the one or more readings in the dwelling.

In one embodiment, the unit can detect various air quality data, including:

| | Measurement resolution | Measuring range | measurement accuracy |
| --- | --- | --- | --- |
| CO2 | | 400~5000 ppm | ±75 ppm |
| PM2.5 | 0.3 ug/m³ | 0~1000 ug/m³ | ±10% |
| PM10 | | 0~1000 ug/m³ | ±10% |

-continued

| | Measurement resolution | Measuring range | measurement accuracy |
| --- | --- | --- | --- |
| Temperature | 0.01° C. | 0~60° C. | ±0.1 |
| Humidity | 0.04% | 0~100% RH | ±1% |
| TVOC | 1 ug/m³ | 0~1200 ug/m³ | |
| CH2O | 1 ug/m³ | 0~500 ug/m³ | |

Another embodiment uses as the BME680 sensor from Bosch. The BME680 is an integrated environmental sensor developed specifically for mobile applications and wearables where size and low power consumption are key requirements. The device integrates for the first time high-linearity and high-accuracy gas, pressure, humidity and temperature sensors. The gas sensor within the BME680 can detect a broad range of gases to measure air quality for personal well being. Gases that can be detected by the BME680 include Volatile Organic Compounds (VOC) from paints (such as formaldehyde), lacquers, paint strippers, cleaning supplies, furnishings, office equipment, glues, adhesives and alcohol. It has gas sensor, humidity sensor, and pressure sensor.

Figure 5:
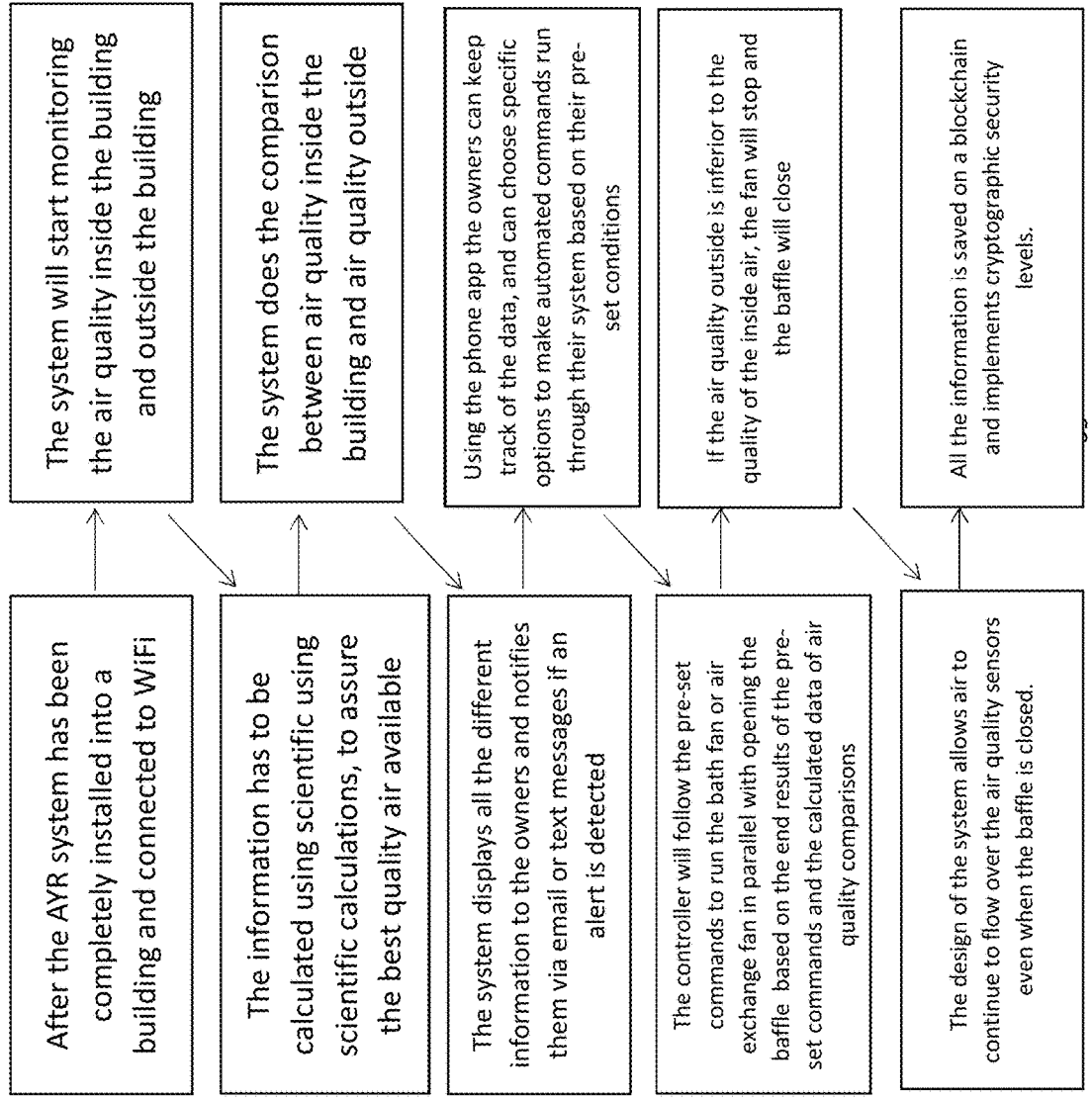
FIG. 5 shows exemplary flow chart in controlling air movement based on sensing air quality.

FIG. 5 shows an exemplary process run by the controller of FIG. 4. First, the system is installed and connected to a WLAN such as a WiFi network. Next, the system will start monitoring the air quality inside the building and outside the building. The information has to be calculated using scientific calculations, to assure the best quality air available. The system does the comparison between air quality inside the building and air quality outside. The system displays all the different information to the owners and notifies them via email or text messages if an alert is detected. Using the phone app the owners can keep track of the data, and can choose specific options to make automated commands run through their system based on their pre-set conditions. The controller will follow the pre-set commands to run the bath fan or air exchange fan in parallel with opening the baffle based on the end results of the pre-set commands and the calculated data of air quality comparisons. If the air quality outside is inferior to the quality of the inside air, the fan will stop and the baffle will close.

It is contemplated that the control system could be further enhanced, to compensate for HVAC fan cycle periods significantly longer or shorter than the predicted cycle period, that may be encountered when an occupant readjusts the thermostat manually, a setback thermostat changes its setpoint according to program, or if a door or window is left open, etc. If the cycle period begins to significantly exceed the predicted cycle period, beyond the natural variation expected due to changes in outdoor temperature, the current cycle period can be artificially divided as previously described, which would tend to adjust the corresponding fresh air time gradually over the next cycle period or two. If the cycle period were significantly shorter than expected, the current fresh air time could be truncated and gradually added back over the next few cycles.

The occupants may be given a control panel with buttons and a display to indicate system status and provide control over the various modes and features.

A variable ACH control feature is provided for the Automatic Fresh Air mode, whereby the occupants may change the level of ACH as a percentage of the rate prescribed by 62.2, at a push of the up/down buttons while in Automatic Fresh Air Mode. This feature enables the occupants to easily adjust the ACH level to suit their needs, such as when additional air exchange is desired, or if the home is to be unoccupied for a period of time.

The Automatic Fresh Air Mode may also be disabled, without disabling other features and modes to be described.

The control also features two other distinct operating modes, besides the Automatic Fresh Air mode previously described: Automatic Make-up Air Mode and Manual Fresh Air mode.

Automatic Make-Up Air Mode: the system also functions as a make-up air system that automatically provides make-up air for exhausting equipment such as clothes dryers, range hoods, and central vacuum systems etc., by bringing in outdoor air while not exhausting stale air, whenever the need is sensed. Providing make-up air prevents depressurization of the home and aids in proper venting of combustion appliances, prevents condensation in exterior walls during high-dew point outdoor conditions, and maximizes functionality of the exhausting devices. Make-up air is increasingly becoming an issue of major concern, especially in northern climates where weatherization of homes tends to be more extreme.

The make-up air feature of the fresh air system also provides the benefits achieved by filtering, treating, and tempering the incoming air by dilution in the system return air. Without such a system, make-up air would be drawn into the home through any and all available openings, such as crawl spaces, and would not be filtered and treated etc.

Automatically providing make-up air can be accomplished either by electrically or mechanically sensing operation of exhausting devices and providing a corresponding amount of make-up air flow for the particular exhausting devices operating at a given time, or by sensing the actual air pressure in the home, and providing the appropriate amount of make-up air to maintain the home at a near-neutral pressure. The control incorporates a pressure transducer to sense house pressure, providing input to the system controller, which actively controls the pressure of the home at all times.

If the pressure sensor senses a negative house pressure exceeding a programmable setpoint, the Automatic Make-up Air mode is triggered, and supersedes any other mode the control may be in at the time.

Control of the net amount of flow of incoming make-up air is accomplished by variable positioning of the fresh air damper (and exhaust air damper if open when the mode is triggered), until a neutral condition is reached. Power-open and power-close unidirectional dampers are used so as the damper gates are moving to full open/full closed they will be halted in a position when a neutral condition is sensed. The system continues to monitor house pressure, if the negative pressure threshold is reached again, the dampers respond by moving further to full open/fully closed positions until the neutral condition is again reached.

The control is programmed to exit the make-up air mode when either positive pressure is sensed in the house, indicating the exhaust device has ceased operation, or when a pre-set time limit expires, to provide exit from the mode in the case a window or door has been opened. A smoothing function is applied to the pressure transducer input to reduce spurious mode triggering/exiting due to closing/opening of doors etc.

Control output for an optional make-up air boost fan provides additional flow capability, which operates the boost fan only in make-up air mode.

It is also contemplated that if a pressure sensor approach is used, by means of automatically-controlled solenoid valves mounted in a manifold block, the same sensor could also be briefly and periodically ported to a very simple flow-measurement device ('thin-plate orifice') installed in the fresh air duct, to measure and monitor actual duct flow, and eliminate the need for the installer to measure the actual fresh air flow and manually provide that input during setup. The flow sensing could also allow compensation for multiple and even infinite variation in HVAC fan speed by providing fresh air flow information to the control during the fresh air cycle, especially if an additional sensor were added that was dedicated to constant measurement of the fresh air flow.

A thin-plate orifice is simply a section of the duct with an abrupt change to a slightly smaller diameter, and abruptly back to original diameter, and is typically a sheet metal pan fitted into the duct, with a central hole of diameter slightly smaller than the duct diameter. Such a device is maintenance-free, is much less prone to error resulting from dust accumulation, has no moving parts, offers little restriction to air flow, and is extremely inexpensive.

The system also periodically re-zeros the sensor to eliminate possible sensor drift problems.

Manual Fresh Air Mode: the occupant interface of the system also includes a manual override feature; whereby the occupant pushes a button that causes the system to provide fresh air at maximum flow for an adjustable period of time. This feature provides extra fresh air on demand, such as when offensive odors may be present. The period of time is adjustable by up/down button control, with the last time setting being the current default. When either the time period expires, or if the manual fresh air button is pressed again, before the time period expires, the system returns to normal operation in the Automatic Fresh Air Mode.

The system also includes additional features including monitoring of fresh air damper operation, with fault detection having a tolerance of intermittent faulty behavior. If sufficient faultiness is detected in either damper, a service alert is displayed for that particular damper and the damper is given the command to remain closed. Additional features may include filter-change reminder display with occupant-selected time interval; monitoring of a UV air purification system; a service alert is displayed if the bulb burns out; and Yearly UV bulb replacement reminder display. A contemplated additional feature would be an installer-customized service alert message for additional equipment that may have alarm contacts, such as a humidifier etc.

Incoming air will always be greatly tempered, and typically further tempered by active operation of the HVAC system's heating/cooling phase, making pre-treating incoming fresh air unnecessary in most installations. Operation of the ventilation system is virtually unnoticeable to the occupants. Increase in power usage from additional fans is minimized. Damper operation noise is masked by HVAC system operational noise. When the HVAC system rarely runs due to mild outdoor temperatures, the ventilation system will activate periodically, which in effect adds an 'economizer' feature to the HVAC system, which also results in periodic filtration and UV treatment of the indoor air when it otherwise would not occur. Reduced installation cost to homeowner vs. an HRV/ERV. All incoming air is economically filtered and UV-treated before distribution. All incoming air is discharged at normal discharge points and is distributed throughout the household by the HVAC system.

Benefits include one or more of the following.
1. Know the air quality.
2. Know the humidity.
3. Know the saving energy.
4. Taking back the control of the air users breathe.

5. Block out pollution.
6. Block out humidity.
7. Save Money

Next, the energy savings achieved with the AYR system are detailed. The energy needed to remove either the air-conditioned air or the heated air is small, a 50-watt fan in most cases. The larger cost is the replacement of cold or heated air. This is an area that homeowners struggle with, they look at one or two 4" holes and think it's like leaving a window open! Most fresh air pipes are connected to the cold air return and when they touch the duct work where the intake air is connected it is cold as ice, they know it's costing them lots of money.

In several states they require a 250 CFM fans that are required to run their fan 24/7 this is done because of the building codes requiring a much tighter building code. Many homeowners once it gets cold or hot put a rag or insulation into the inlet pipes. I feel if you supplied the customer with the data of their air quality, it would give them the information they needed and can see the health benefits, they would stop plugin their intake pipes.

The air exchange volume determines the energy cost for homeowners. For more information and understand how much you need to replace the cold and hot air. Air movement is a consequence of the fan's airflow. Air requires in the ballpark of 0.24 BTU per pound to raise it 1-degree F. 1 CF of air weighs about 0.0807 lb., so it takes roughly 0.0194 BTU per CF per degree.

A typical small bathroom fan exhausts about 70 CFM or 4,200 CF per hour. That would take roughly 81.5 BTU per hour to change it 1 degree. Some states require 250 CFM which is 3.571 times more, so doing the math that would equal 15,000 CF per hour roughly 290 BTU per hour. In one example, the outdoor temperature has 40 degrees differential and that would require roughly 3,260 BTU per hour to make it the same temperature as the indoor air.

If the user is heating or cooling with electricity, 1 watt=3.412 BTU/hr. so this example would be roughly equivalent to a load of 1 KW. Running it continuously would add about 700 KWH per month to the electric bill in the winter if that temperature difference was an average (roughly $100), not including the electricity to power the fan.

So, using the 250 CFM state law requirements (In some states) it would roughly use 11,640 BTU per hour roughly equivalent to a load of 4.39 KW. Running it continuously would add about 3000 KWH per month to your electric bill in the winter or summer if that temperature difference was an average (roughly $375.00 based on 0.12 cents per hour, Natural gas (NG) at 0.58 cents per therm would be 6 cents per hour roughly 187.00) not including the electricity to power the fan. If a fan is on 24/7, it won't take long for the exhaust fan to exhaust several room airs changes every hour.

When air is removed from a house, "make-up" air must be brought into the house. This causes your heater or air conditioner to "work" to make it conditioned air and, it's expensive to remove "conditioned" air and replace it with "unconditioned" air and then pay to "condition" it.

In summary, a home purifying system and the AYR Quality System could save the homeowner half of $31.25 roughly $15.62 per month 187.00 on electric half that cost on NG per year, which means in can pay for itself in less than 2 years.

Thus, there is described a whole house ventilation system which determines a fresh air vent time by sensing input air quality. The controller also includes a make-up air mode and fresh air mode. The system addresses problems arising from laws requiring higher R value and more air-tight homes and business, causing gas and oil furnaces and water heaters to lower the oxygen level; at the same time germs where trapped as well. The system controls air flow according to the air quality outside. The system can close the external air in case of forest fires, smog, pesticide, auto exhaust, and humidity outside which can aid in growing mold.

Figure 6:
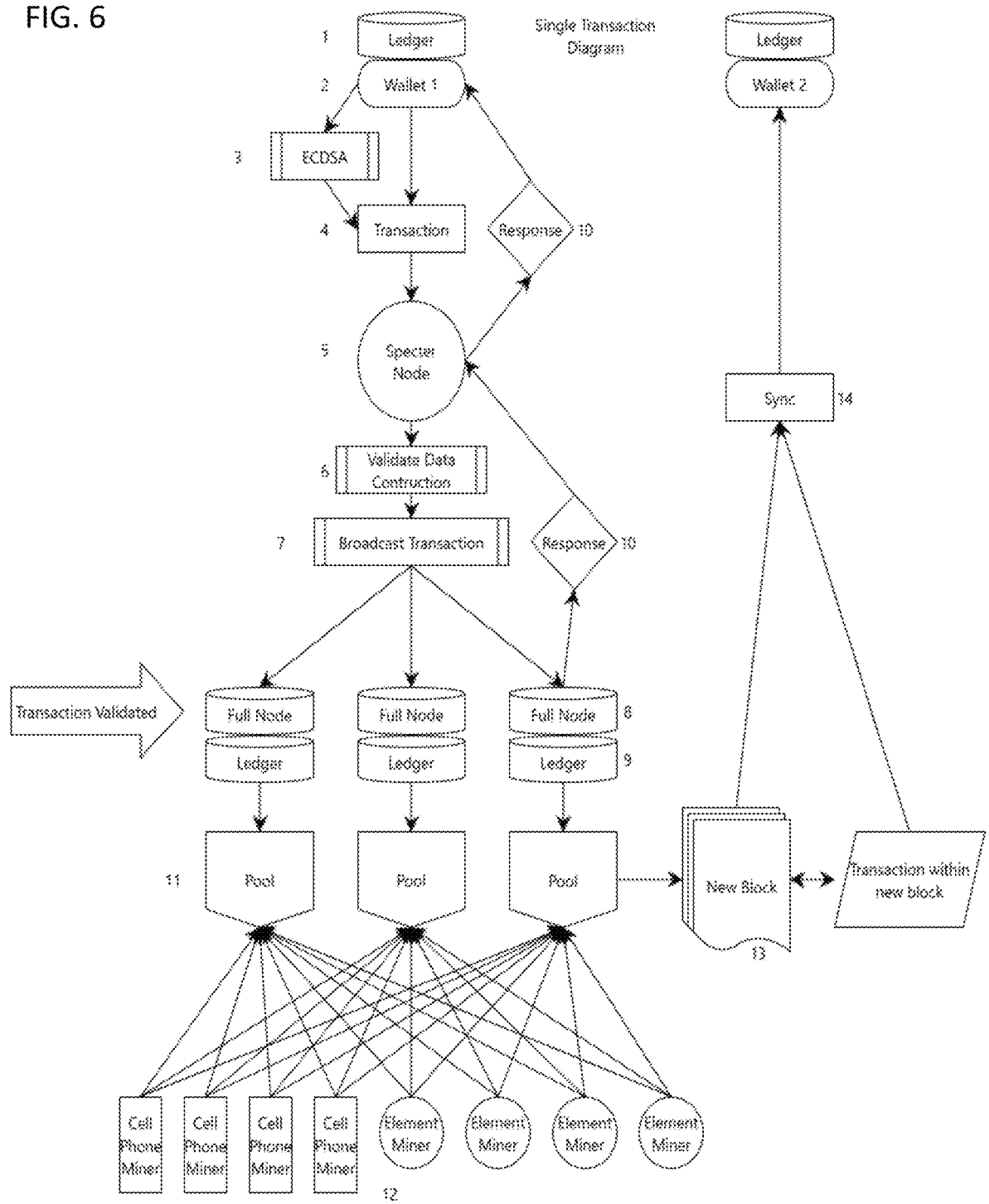
FIGS. 6-7 show exemplary blockchain based control system for the air flow controller of FIG. 4.
Figure 7:
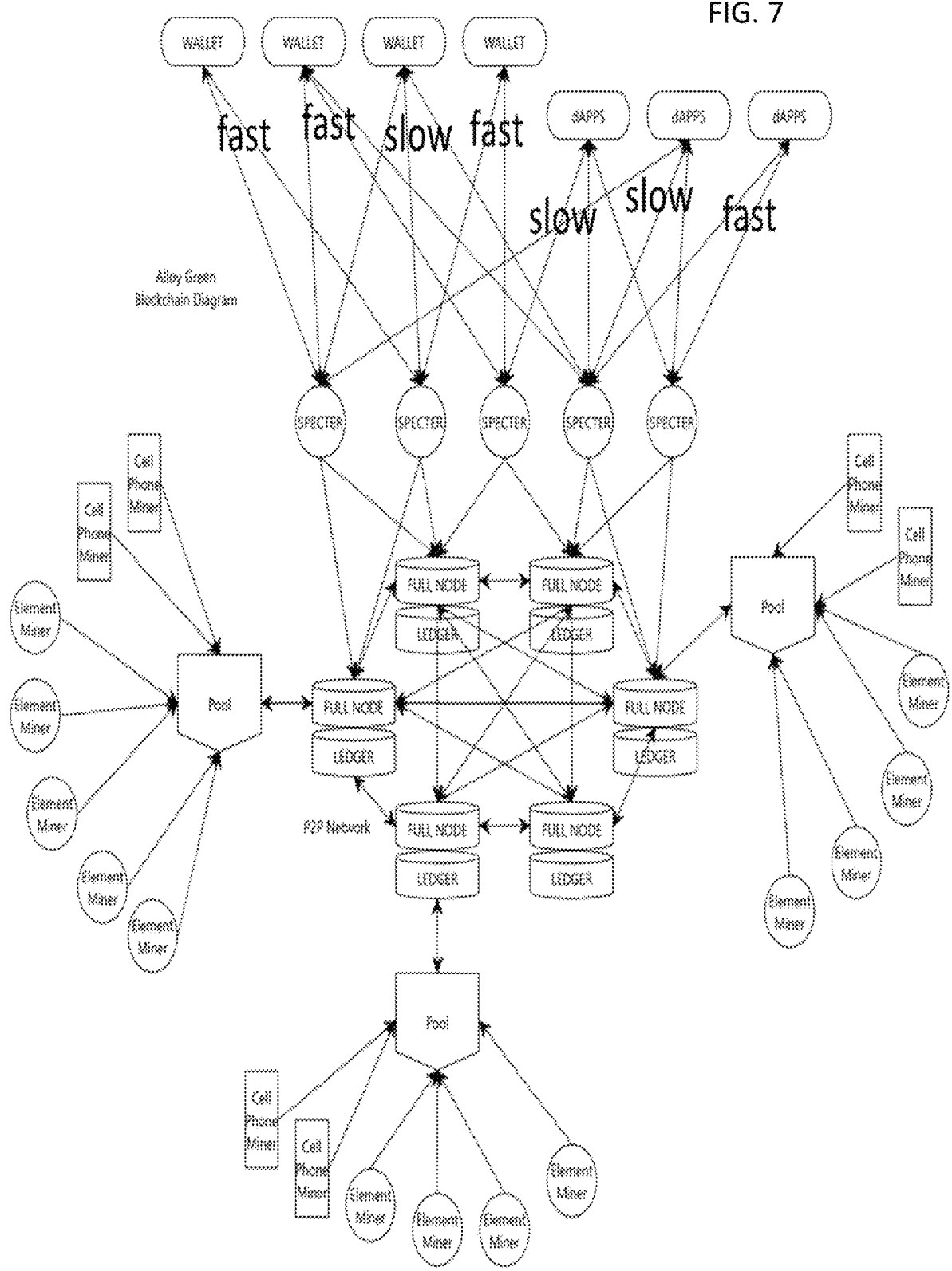

FIGS. 6-7 show in more details one exemplary low power consumption blockchain network used in the present systems. Designed with minimal electrical demand in mind without sacrificing blockchain performance and with enhanced security over traditional blockchains. The issue found was that the energy consumption of traditional blockchains continues to rise to exponential numbers. All while the world is collectively seeking to reduce overall demand on energy. By designing a blockchain with low energy consumption as a focus, the resultant blockchain technology is far superior to existing systems which rely on massive banks of graphics processors producing excessive heat and consuming many gigawatts of energy. Therefore, a new technology was required; Rather than the traditional Proof of Work method, the system uses Proof of Work Collaborative, wherein the miners share workloads across the network to reduce overall energy need by an order of magnitude. All while being faster and more secure than traditional blockchains.

In one aspect, the system is a fully functional blockchain which is operated in collaboration with its component elements, rather than competitively as are previous blockchain technologies. By design, this is a blockchain and crypto-mining system which is highly efficient and due to that efficiency, reduces energy consumption of the blockchain or blockchains within the network or networks by considerable and notable amount. This lower energy requirement as a byproduct of allowing the network to operate on low power electronics or within electronics as a background function.

Multiple blockchains can share network workloads to further improve overall efficiency and speed. The blockchain can be fully decentralized across its network or networks. The blockchain can be fully centralized across its network or networks. The blockchain to operate as private, closed networks. The blockchain can operate as open, publicly accessed networks. The devices operating the network are low cost, low power hardware such as a microcontroller for the air sensors. The devices operating the network can be Internet of Things devices. The devices operating the network may be devices within appliances, sensors, drones, medical device, aerospace vehicles, or motor vehicles. The devices operating the network are part of another network sharing workload across multiple networks. The system can augment security system based on SHA-256 and SECP256K1. The system can establish a secure communication between two or more IoT type devices via blockchain. Wherein secure identification for each device is thoroughly checked with each communication within the network. The devices of the network or networks are components of one or more of one or more devices comprising in part or as a whole, from or contained within; dedicated devices, automobiles, locomotives, medical devices, household appliances, personal or non-personal digital devices, commercial or industrial devices, and/or devices within aircraft or aircraft.

The blockchain described here uses Proof of Work Collaborative (POW-C) technology. Where traditional blockchains use Proof of Work (POW) technology already, the POW-C system reduces both the energy required to process a transaction as well as the size of the devices within that blockchain that can operate the blockchain. This not only reduces the needs of electricity consumption but also the space used by many of the devices involved. This specifically benefits Internet of Things or IoT. And shows great promise in the IOT field. One implementation uses a device called a NodeMCU. It is a small, Arduino compatible controller chip designed for IoT.

One implementation operates as follows:

1. Wallet ledger: A copy of the ledger contained within the hardware or software wallet. Hardware wallets will be based on (NodeMCU) With memory card added.

2. Wallet: The result of the transactions related to the wallet address. Based on the (NodeMCU) and using an added memory card to store the ledger within a simple case.

3. ECDSA: Elliptic curves digital signature.

4. Transaction: The data that a wallet sends to the network which carries outputs from previous transactions and inputs for current transactions, in order to spend coins owned by the wallet, the wallet needs to sign the transaction to prove owner ship to the coins it is trying to spend, which is pretty similar to how Bitcoin and Ethereum and Litecoin.

5. Specter: A security miner that oversees the network prior to the full nodes distributing the workload to the Element Miners and Cell Miners. Also based on the (NodeMCU) hardware 6. Data Validation: Performed as part of the Specter's workload, verifying the data is in the correct format and without errors, it also makes sure the data is clean, no exploits or attacks. By performing this check, the system provides another layer of security for the users.

7. Broadcast Transaction: When the Specter is finished validating the data of the transaction, the transaction is broadcast to multiple full nodes.

8. Full Node: Receives the transaction from the Specter and validates the transaction's legitimacy and then passes the data to the mining pool for the miners. Full Nodes are based on the Raspberry Pi or compatible hardware and equipped with a screen to monitor traffic. The Full Nodes also have a storage card to store the ledger.

9. Full Node Ledger: Each Full node keeps a copy of the blockchain ledger on it's internal storage card. Storage cards are typically 32 gb Micro SD cards of class 10 speed.

10. Responses: When a transaction is received, the full node replies with a response to the Specter miner which passes the response to the wallet, the response either includes 'error' message, or 'ok' message which means the transaction was broadcast to the network successfully.

11. Pool: The mining pool, standard mining pool the same as mining pools for any other blockchain.

12. Miners: There are two types of miners. The first is the 'Element Miner' based on the NodeMCU hardware for minimal energy consumption. These are fitted to a simple protective case. The second type is 'mobile miners' based on a Cell Phone application. The miners perform the tasks of confirming transactions and finding new blocks.

13. Blocks: A block contains transactions and data, which is recorded in the ledger. This is the same as other blockchains.

14. Sync: The process of synchronizing the blockchain ledger across the network and updating ledger records of the completed transaction(s).

The system blockchain starts with the test network, which is similar to Bitcoin or Ethereum test network idea, where it is used to test implementations, before those implementations are eligible to deploy to the live network.

In the peer to peer network topology diagrams, a new type of miners is called Specter miner. The Specter miner is the security gateway for accessing the peer to peer network, as mentioned in the white paper, the system peer to peer network implements a fragmented decentralization model, which fragments the nodes into specific nodes, that carry specific functionalities, which if compared to Bitcoin, everyone knows that Bitcoin wallet software is all in one implementation, which means the same wallet can act as a client, and as a full node, as explained on Bitcoin.org On the other side, the system implements fragmentation, which divides the wallet software to a standalone client, and a standalone full node. This method allows inserting the Specter miners in between different nodes communicating on the network.

The client still downloads and synchronizes the complete ledger from the peer to peer network, and the full node also downloads and synchronizes the full ledger, but the client cannot operate as a full node, and the full node cannot operate as a client.

Following that structure, the result is a sophisticated specific protocol communication between all nodes on the network, and the Specter miners are the ones who verify the protocols and deploy the messages.

Following this topology, it appears that exploits arrive at a dead end, simply because the Specter miners do not carry an operating system, as in Linux or Windows or Mac, therefore no exploits have been implemented for those nodes.

The Specter miners act as servers and clients, and are hosted by the public, who buy the miners to receive coins from new blocks, therefore the Specter miners represent a decentralized network. The clients (simple wallets) communicate with the peer to peer network through the Specter miners, which means every request passing on the network is being filtered by the Specter miners before being passed on to the full nodes, this process includes digital signature generation from the Specter miners to be approved by the full nodes eventually. Therefore in case someone tries to send direct exploits to the full nodes, his sockets will be missing the digital signature, or carry a rejected signature.

The full nodes are not vulnerable either, they carry their own security enhancement, which filters data and prevents buffer overflows, full nodes also work based on a protocol specific communications, where they do not accept any socket without the proper protocol headers. Fragmented decentralization is a partial key for enhanced security levels, compared to Bitcoin and other networks. The core of the peer to peer network is the full nodes, just like in Bitcoin and Litecoin, because the full nodes accept synchronize requests and help broadcasting transactions. Therefore, protecting the full nodes from being exploited is one feature that the present blockchain implements. In consensus is a famous term, that people understand about full nodes in a blockchain industry which means the full nodes carry the same ledger at least minus current block.

The system confirms whether a Full Node is in consensus with the rest of the network or not, because the miners query random Full Nodes at certain situations, and the answers from the full nodes need to match each other in order to be considered in consensus. An example to explain this topology is when a Full Node replies with UXTO for a wallet, that is different from other Full Nodes replying for the same wallet, the system blockchain implements verification levels that calculate how many Full Nodes voted yes, and how many voted no, and the result of accuracy and correctness needs to be above 93% in order for a transaction to confirm. Therefore, the system does not fall under the 51% attack, because there is a new role for measuring decisions on the network.

Pseudo codes and detailed explanation for functions and processes

```
Peer to Peer Client Wallet
On application start
If ('wallet.dat' file does not exist)
{
Show the sign up interface;
}
Else
{
Show the login interface;
}
Both sign up interface and login interface include 6 input fields for the SEED
Signup interface
Login interface
Sign up interface active:
Create a new wallet
If (word1 of SEED and word2 and word3 and word4 and word5 and word6 have minimum length of 8 characters )
{
Check if the different words are unique among each other by calling the check duplicates function;
}
Function checkduplicates (array of strings)
{
Create a new list of strings;
Create a Boolean and set its value to false;
Loop through the input array of strings;
Check if the list of strings contains the value in the array of strings during loop
If (list contains value) {
Turn Boolean to true;
Break the loop;
}
Add the value to the list;
Return the Boolean;
}
```

When receiving a result from the checkduplicates function, the Boolean will indicate the uniqueness of each word in the SEED entered by the user.

```
If (word1 and word2 and word3 and word4 and word5 and word6 is unique)
{
Hash each word separately to a SHA256 hash;
}
Function SHA256(string)
{
Take the input string into a variable;
Generate SHA256 for the input string;
Return the SHA256 result of the input string;
}
```

As a result for the previous hashing operation, all 6 words of the SEED have been hashed individually.

The next step:
Create a new string;
newString=SHA256(SHA256(word1)+SHA256(word2)+SHA256(word3)+SHA256(word4)+SHA256(word5)+SHA256(word6));
This new string is the hash of concatenated double hashed words of the SEED.
The next step is as follows:

```
For loop (for the number of characters in word6 of the SEED)
{
newString = SHA256(newString);
}
```

The previous loop hashes the newString for a number of times of how many characters are in the word6 of the SEED.

The newString was already a hash of concatenated double hashed words of the SEED.

Then the code creates another string which the hash of the hashed word6 is +word5+word4, this is the second half of the SEED but reversed, and hashed.

secondString=SHA256(SHA256(word6)+SHA256(word5)+SHA256(word4)); The next step is to assign the time stamp to variables.

Date=current date in the system;

Time=current time in the system;

Note, the date and time are used in randomizing the coefficient of the equation, and it does not matter how accurate or correct they are.

The next step is to assign a balance of 0 coins

Balance="0.00000000";

After the previous steps the code makes a modification to the secondString that was created earlier.

```
secondString = SHA256(secondString + SHA256(date)+ SHA256(time) + randomstring( ));
function randomstring( )
{
create ASCII characters in a variable; create a char[100];
create a simple random number generator; loop through the length of the char array
{
Append a random character;
}
Convert the char array to a string;
Return the string;
}
```

The next step is to generate the private key, which is done using a random number generator, that is a mix of rolling dice and capturing random pixels off of the screen of the computer, a very close mechanism as in bitaddress.org After the private random key is generated, it goes through the famous public key generation using elliptic curves, that is published on Bitcoin documentation, and is also used by Litecoin and plenty other coins.

From the public key, the 32 bit address is generated by following the same steps as Bitcoin again.

At this point the code is ready to create the initial string, which will be encrypted using AES encryption and saved in the wallet.dat file Initialstring=privatekey+newString+secondString;

Then the AES encryption function is initialized, and it relies on the newString and the secondString to encrypt the data stored in the file.

```
Function encrypt( )
{
Check if the newString is empty and display an error if true;
Call the Rijndael managed function by sending the (newString);
Receive the encrypted string from the function
Use the string to encode the initial string
}
Function Rijndael managed (string)
{
Receive the input string and use it as a salt;
The password is the secondString;
The salt and the key are used to apply the AES encryption;
}
```

The result of the above operations is an encrypted file content, which is AES encrypted based on the newString and the secondString.

Therefore in order to decrypt the file, someone must have the exact 6 SEED words, and in order to brute force the SEED there are multiple steps to break, and that is not easy to accomplish.

At this point the wallet has prepared a new wallet.dat file content, which is encrypted and contains the private key.

```
Function restart( )
{
Create wallet.dat file;
Write the encrypted initialString to the wallet.dat file;
}
The next step is to call the login function.
Function login ( )
{
Modify the interface layout;
Hide contents;
Show other contents;
Call ledger function;
}
Function ledger ( )
{
```

-continued

```
Check if ledger.dat file exists;
If (ledger.dat exists)
{
Exit;
}
Else
{
Create ledger.dat file;
}
}
```

Next step is to start a new thread, that works in the background of the application.

The thread is dedicated to synchronize the ledger from the blockchain, and update the wallet variables based on the readings, and parsing of the blocks contents.

The thread run in a loop, which repeats itself with a delay.

The first step before starting the loop is to get the network height.

In order to get the network height the wallet needs to identify valid peers which it can connect to and ask information.

The peers on dynamic ip addresses, unless some peers have static ip address, but in both cases the same process to discover peers apply.

If it is the first time for the wallet to run, it means it does not carry any history for peers ip addresses on the network, therefore it will need to connect to the DNS tracker, to get a list of peers, then it can query the peers for their known peers and does not need to connect to the DNS tracker again.

If it is not the first time for the wallet to run, then it will carry history of peers in its data storage, and it can use this list to connect to any peer and retrieve new peers from it.

In case all peers in the list history are down, then the wallet will query the DNS tracker for a fresh list and carry on from there.

```
Function peers( )
{
Check wallet storage for peers list;
If (no list found)
{
Connect to DNS tracker;
Collect list;
Add list to storage;
}
If (list found)
{
Loop through the list to find alive peers;
If (alive peers are found)
{
Request fresh peers list;
Updat4e peers list in storage;
Request network height;
}
Else
```

-continued

```
{
    Connect to DNS tracker and request a fresh peers list;
}}
}
```

Once the peers list is populated, and the network height is retrieved, the wallet is ready to synchronize the ledger.

```
Function synchronize ( )
{
Loop through peers list
{
Try to connect to live peer;
If connected
{
Send protocol specific message requesting ledger synchronizing;
Receive response from peers;
Parse response;
Extract network height;
Parse the block list received from the peer;
Insert the data into wallet storage;
Parse the blocks content and headers;
Verify correctness of block headers to follow the chain rules;
Update wallet balance and transactions history based on the data flow;
}
}
}
```

The previous process runs over and over within the loop and does not interfere with the wallet layout functionality because it is on a secondary thread running in the background.

The delay factor changes based on the difference between the network height and the wallet height, if the range is large the delay factor decreases, while if the range is small the delay factor increases relatively.

This feature keeps the network less busy, and saves resources, since the synchronized wallets do not have to send as many requests as the new wallets or unsynchronized wallets.

Therefore when a wallet reaches a good amount of synchronizing which makes it considered an up to date wallet, and that would happen if network height−wallet height<2 or 3

At this level the wallet will slow down on querying the network and investigating new peers, which allows more resources for other wallets where for example network height−wallet height>50,000

If the network height−wallet height is a large difference then the wallet will keep the delay factor small in order to catch up on the blocks it is missing.

Therefore the relationship between the delay factor and the difference between the network height and wallet height is inversely proportional. Yet the delay factor does not increment or decrement gradually, on the contrary, it increments suddenly, or decrements suddenly based on the if condition that is investigated every time the loop completes a cycle.

The relationship between the delay factor and the level of synchronization of the wallet, has a direct effect on the traffic over the peer to peer network.

In the following diagram the wallets with slower queries and slower traffic show saving resources on the network, to allow other wallets to query fast synchronization until they reach the same level of saturation as the slowed down wallets.

Login Interface Active:

Login the existing wallet.dat file

In case on application startup a wallet.dat file exists, the application will initiate the login interface and will request the correct 6 SEED words to access the current wallet.dat file.

Once the user inserts the 6 words of SEED and click the login button, the application will use the SEED words to perform the hashing steps and then calls the decrypt function

```
Check duplicate;
Hash SEED words separately using SHA256( );
Generate the newString;
Generate the secondString;
Function decrypt ( )
{
```

Using the newString and the secondString decrypt the contents of the wallet.dat file; If the salt and cypher generate correctly and a successful decryption takes place:

```
Authorize and initiate the access function; If the encryption fails:
Reject, and prompt user that the SEED is incorrect;
}
```

If a successful login is in place, the wallet extracts the private key into a string, then it uses the private key to generate the public key and wallet address.

The application disposes the strings for the private key and public key, and only keeps the wallet address that is 32 characters long.

This way the privatekey is only carried in the device memory for an instance to derive the public key Then the public key stays for another instance, to derive the wallet address, and both key are removed instantly from the device RAM.

During synchronization the wallet only need the wallet address.

Such a technique allows the wallet to keep the private key encrypted even while running.

The same conditions apply to the SEED words and any critical information where the wallet can replace the SEED words with the newString and secondString, which are SHA256 variables.

Then once the wallet address is retrieved the wallet can empty all the strings and variables instantly and keep their value empty in the device RAM. When sending a transaction the wallet needs to identify the private key to sign the transaction by using ecdsa signature, at this point the wallet needs to decrypt the wallet.dat file again to access the private key.

There are two different implementations that have been adopted in the Alloy Green wallets, one of them is to keep the first three words of the hashed SEED in the device memory, and dispose the other half of the SEED, after login, and when a transaction is required the user has to input 3 words of the SEED.

Another implementation in a different version of the wallet keeps an encrypted form of some words from the SEED in the memory after login, and prompts the user for less words when attempting a transaction.

Yet in both cases the wallet eliminates storing variables in the device memory, that allow retrieving the decryption parameters, which are hashes of the words of the SEED in certain orders and certain combinations as explained earlier.

Updating Wallet Balance

Synchronizing the open ledger allows the wallet to parse the block contents and retrieve the transactions related to the wallet.

Any new block downloaded must have a matching previous blockhash to the previous block hash.

The wallet extracts the transactions and shows notification on the operating system alerting the user of incoming transaction.

The adopted mechanism is very similar to the one in Bitcoin, Litecoin, and other coins, which seems to be the most suitable adoption to the subject.

On exiting the wallet, the wallet attempts to clear any variables it had in the device memory and were necessary while the wallet running.

The system implements enhanced features to filter every socket transferred on the network, this filtering of data enhances the network security overall. Wallets are also secured within, every wallet (client) acts as a standalone banking system, the wallet.dat file is where the WIF is stored, yet it is encrypted, and the whole wallet.dat file is always encrypted, the encryption is based on AES Rijndael, and the SEED is involved within the encryption, the user decides upon the SEED, which means that even if the user lost his laptop or left it unlocked at school or work, or a public place, and someone tried to steal his wallet.dat file, the hacker is still up against decrypting AES which is not a simple or easy task to perform, especially that the SEED contains 6 words, and each word has to be unique from the other 7 words, and least 8 characters, then sha256 is applied to the SEED words, and different combinations and divisions of the sha256 happen before the calculations of the AES encryption take place.

SHA256 is a one-way hash function, therefore guessing the SEED and breaking the AES is not an easy task to achieve. Elliptic curve SECP256K1 is another strong cryptography area implemented in the The system blockchain, which is just like other cryptocurrencies, Bitcoin, Ethereum, Litecoin . . . etc. ECDSA is another implementation which is famous in the industry and is used by The system blockchain to sign transactions.

Fragmentation makes it more difficult for hackers to run exploits, because there are more nodes on the peer to peer network, and the nodes carry different functions from other nodes, when this is compared to Bitcoin network, and how it is all in one software, you can notice the difference between the security level of each network.

Proof of work collaborative, allows all miners participating in the network to solve the equations together, confirm transactions together, and find new blocks together, without having to compete, therefore each participant can carry any small piece of the equation without having to worry about competing with another participant, and in return the participant gets rewarded based on the amount of work calculated by his miner(s).

Proof of work collaborative aims towards more decentralization, and more fragmentation, when compared to usual proof of work, where a Bitcoin single mining farm can control almost 50% of the network, by producing and selling ASIC miners, this takes the network towards centralization instead of decentralization, while in The system blockchain the new concept of proof of work collaborative prevents that incident, because all miners combine their work and calculations, and there is no competition among them, therefore wasted work and wasted calculations has decreased by a very large amount compared to the usual proof of work model.

The more miners the faster the network, is because the Specter miners are the gateways between the clients and the Full Nodes, and the more Specter miners exist on the network, the more ability of digesting more transactions per second.

On the same page, the element miners and cellphone miners, play a good role in speeding the network by confirming transactions faster and hashing faster.

The full nodes also play a good role, where more full nodes mean more resources on the network and faster transactions. Therefore the network scales by adding more miners, and full nodes, which is a usual case for any peer to peer network. In one embodiment, the network will start at 1,000 transaction per second, and scale up to 10,000 transactions per second. At that level, when a block target is 30 seconds, it means the network can digest 300,000 transactions per block, compared to Bitcoin, a block takes about 10 minutes and holds and average of 2,000 transactions per block.

Scaling is also involved in different sides of the DAPPS, and the network is built to scale gradually based on expanding the nodes and the miners. DAPPS are not all concerned about speed, some DAPPS are concerned about storage size more than speed, others are concerned about speed and not the storage, and some are concerned about both.

The blocks in the system blockchain do not just carry transactions, but also carry data, the data is from various industries using the blockchain as a proof of operation. The data logged by the equipment is verified by the Specter miners to underlie specific DAPPs categories. Data transferred by industrial equipment carry digital signature based on ECDSA to confirm identity and therefore confirm sincerity of the data logged into the blocks and the open ledger. The system is not just a coin blockchain, but a blockchain that implements DAPPS and supports industrial equipment to log data history in the open ledger, where such data is signed to verify the industrial equipment and differentiate machinery by ID.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

One embodiment can be a cryptographic wireless Key for Automobile. When using a wireless remote to control the keyless entry and the ignition start for a car or truck, any hacker can sniff packets from the air, that were sent by the wireless key and copy the valid commands and repeat them to mess with the automobile. The communication between the sender and the recipient unit is protected by a new level of cryptography which involves symmetric and asymmetric encryptions, it also involves enhanced algorithms that prevent intruders and hackers from being able to duplicate a radio signal that was sent from the legitimate automobile wireless key and try to send it as it was (duplicate) in an attempt to mess with the automobile recipient unit. The term cryptographic means applying a digital signature based on ECDSA for example or an RSA. Taking an example of the ECDSA based on elliptic curves digital signature and Diffie Hellman key exchange, the commands sent from the automobile wireless key to the recipient unit will carry a digital signature, in addition to this, a new level of enhancement is being applied to prevent a hacker from copying a command including a correct digital signature and trying to repeat it and mess with the recipient unit, this new level is based on an algorithm which does not allow using the same random key for a digital signature twice, therefore the parameters for the digital signature (r,s) will always be different for the digital signature because the sender (automobile wireless key) and the receiver (automobile receiving unit) will keep track of which (r) has been used before and will not permit reusing the same (r). If the automobile wireless key will send a command every second, it means it will send 31,536,000 commands per year, and it uses the secp192r1 curve which is one of the smallest elliptic curves it means there is 1990455902900393443631338604517905383086743862399 80 years left to run a command with a new signature every second.

Similarly, the blockchain can be used to control a wireless thermostat or a Wi-Fi thermostat to control an air conditioner unit or a heat pump or a boiler, the blockchain is used to prevent any hacker from sniffing packets from the air, that were sent by a wireless thermostat or a Wi-Fi thermostat and copy the valid commands and repeat them to mess with the recipient unit.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. A memory and a processor may be discrete components of a network entity that are used to execute an application or set of operations as described herein. The application may be coded in software in a computer language understood by the processor, and stored in a computer readable medium, such as, a memory. The computer readable medium may be a non-transitory computer readable medium that includes tangible hardware components, such as memory, that can store software. Furthermore, a software module may be another discrete entity that is part of the network entity, and which contains software instructions that may be executed by the processor to effectuate one or more of the functions described herein. In addition to the above noted components of the network entity, the network entity may also have a transmitter and receiver pair configured to receive and transmit communication signals (not shown). In some embodiments, a cloud computing system may be provided for communicating with one or more sensing devices. The cloud computing system can analyze pressure data provided from a sensing device, and can determine or verify occurrences of leaks and can characterize the leaks.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-theshelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto. It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order, shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system, comprising:
   an inlet to collect air from outside a building;
   an air filter coupled to the inlet;
   a baffle to receive air from the inlet;
   an actuator coupled to the baffle;
   one or more sensors exposed to air from the air filter to determine air quality;
   a controller coupled to the one or more sensors and the actuator, the controller closing the baffle if air quality is below a threshold; and
   an outlet positioned after the baffle to deliver air to the building, wherein the controller makes air characteristic entries on a blockchain with Proof of Work Collaborative (POW-C) with a wallet ledger where a result of transactions are coupled to a wallet address, wherein the controller applies elliptic curve digital signature, and wherein the controller communicates on a network with a security miner that oversees the network prior to one or more full nodes distributing workload to other miners, the controller programmed to allow all miners participating in a blockchain network to solve equations together, confirm transactions together, find new blocks together, and combine their work and calculations without having to compete, thereby supporting the POW-C and reducing the energy required to process a transaction.

2. The system of claim 1, wherein air inside the building is combined with air from the outlet.

3. The system of claim 1, wherein the air filter is removable or replaceable.

4. The system of claim 1, comprising an air heater or air conditioner coupled to the outlet.

5. The system of claim 1, wherein the actuator opens the baffle if outside air quality is better than indoor air quality.

6. The system of claim 1, wherein the actuator prevents cold or hot air from entering the building.

7. The system of claim 1, wherein the controller is below a ventilation unit.

8. The system of claim 1, comprising a hole proximal to the air filter to allow continuous monitoring of outside air even if the baffle is closed.

9. The system of claim 1, wherein the baffle in the closed position allows air to flow over the sensors to get a continuous outside air reading.

10. The system of claim 1, comprising a carbon dioxide sensor.

11. The system of claim 10, wherein the sensor measures within 400 to 5000 ppm.

12. The system of claim 1, comprising a temperature sensor.

13. The system of claim 1, comprising a humidity sensor.

14. The system of claim 1, comprising a TVOC sensor.

15. The system of claim 1, comprising a CH20 sensor.

16. The system of claim 1, comprising gas, pressure, humidity and temperature sensors.

17. The system of claim 1, comprising a Volatile Organic Compounds (VOC) sensor.

18. The system of claim 1, comprising sensors to monitor air quality inside and outside a building.

19. The system of claim 1, comprising a phone app to provide options to make automated commands based on pre-set conditions and the controller follows pre-set commands to run an air exchange fan in parallel with opening the baffle based on the pre-set commands and calculated data of air quality comparisons and if air quality outside is inferior to inside air quality, the controller stops the fan and closes the baffle.

20. A system, comprising:
   an inlet to collect air from outside a building;
   an air filter coupled to the inlet;
   a baffle to receive air from the inlet;
   an actuator coupled to the baffle;
   one or more sensors exposed to air from the air filter to determine air quality;
   a controller coupled to the one or more sensors and the actuator, the controller closing the baffle if air quality is below a threshold, the controller controlling a make-up air system that automatically provides make-up air for exhausting equipment by bringing in outdoor air while not exhausting stale air and wherein the controller makes air characteristic entries on a blockchain with Proof of Work Collaborative (POW-C) with a wallet ledger, and wherein the controller communicates on a network with a security miner that oversees the network prior to one or more full nodes distributing workload to other miners, the controller programmed to allow all miners participating in the blockchain network to solve equations together, confirm transactions together, find new blocks together, and combine their work and calculations without having to compete, thereby supporting the POW-C and reducing the energy required to process a transaction; and
   an outlet positioned after the baffle to deliver air to the building.

* * * * *